(12) United States Patent
Pozzi et al.

(10) Patent No.: US 9,169,021 B2
(45) Date of Patent: Oct. 27, 2015

(54) CLASS DIVIDING PASSENGER SEAT BULKHEAD

(71) Applicant: B/E Aerospace, Inc., Wellington, FL (US)

(72) Inventors: Alexander Nicholas Pozzi, Winston-Salem, NC (US); Jeffrey W. Hontz, Winston-Salem, NC (US)

(73) Assignee: B/E Aerospace, Inc., Wellington, FL (US)

( * ) Notice: Subject to any disclaimer, the term of this patent is extended or adjusted under 35 U.S.C. 154(b) by 222 days.

(21) Appl. No.: 13/939,487

(22) Filed: Jul. 11, 2013

(65) Prior Publication Data

US 2014/0014774 A1 Jan. 16, 2014

Related U.S. Application Data

(60) Provisional application No. 61/670,409, filed on Jul. 11, 2012.

(51) Int. Cl.
*B64D 11/06* (2006.01)
*B64D 11/00* (2006.01)

(52) U.S. Cl.
CPC ............ *B64D 11/06* (2013.01); *B64D 11/0015* (2013.01); *B64D 11/0023* (2013.01); *B64D 11/0601* (2014.12); *Y02T 50/46* (2013.01)

(58) Field of Classification Search
CPC ..... B64D 11/015; B64D 1/10; B64D 11/0023
USPC .......................................... 244/118.5, 118.6
See application file for complete search history.

(56) References Cited

U.S. PATENT DOCUMENTS

| | | | | |
|---|---|---|---|---|
| 5,165,626 A | * | 11/1992 | Ringger et al. ............ | 244/118.5 |
| 5,393,013 A | * | 2/1995 | Schneider et al. ......... | 244/118.5 |
| 5,577,358 A | * | 11/1996 | Franke ......................... | 52/238.1 |
| 7,530,529 B2 | * | 5/2009 | Bock ........................... | 244/118.5 |
| 2004/0031884 A1 | * | 2/2004 | Lambiaso ................... | 244/129.5 |
| 2009/0200422 A1 | * | 8/2009 | Johnson et al. ............. | 244/118.5 |

* cited by examiner

*Primary Examiner* — Christopher P Ellis
*Assistant Examiner* — Richard G Davis
(74) *Attorney, Agent, or Firm* — Shumaker, Loop & Kendrick, LLP

(57) ABSTRACT

A bulkhead for dividing passenger seating classes, and a passenger seating arrangement including a bulkhead, the bulkhead configured for attachment to the back of a first row of premium class passenger seats, wherein a backside of the bulkhead is fitted with amenities that serve an aft positioned second row of economy class seats, wherein the first row of seats includes a lesser number of seats than the second row of seats.

18 Claims, 3 Drawing Sheets

CLASS DIVIDING PASSENGER SEAT BULKHEAD

CROSS-REFERENCE TO RELATED APPLICATION

This application claims priority to U.S. application Ser. No. 61/670,409 filed Jul. 11, 2012, the contents of which are incorporated by reference herein.

TECHNICAL FIELD AND BACKGROUND OF THE INVENTION

The present invention relates generally to bulkheads for dividing passenger seating classes, and more particularly, to a bulkhead integrated into the rear of a pair of premium class seats that is fitted with tray tables, video hardware and other amenities that serve an aft positioned row of economy class seats.

Aircraft cabins are typically divided into premium class seating at the forward end of the cabin and economy class seating in the middle and rear end of the cabin. Classes are typically divided at the seats by a bulkhead extending from floor to ceiling, and in the aisle by a curtain. Premium class seating typically includes larger, more comfortable seats, a less dense seating arrangement and personal amenities commensurate with the level of luxury of the seats. Economy class seating typically includes smaller seats, a more dense seating arrangement and often shared amenities.

Due to seat size and seating density differences between classes, it is common for rows in economy classes to include a greater number of seats than equal length rows in premium classes. For example, economy class rows may include three seats, while an equal length row in a premium class may include only two seats. When all rows of seats within the same class include the same number of seats, it is possible to locate each seat's amenities, such as a tray table, video hardware, storage pocket, etc., on the back of the seat in the row immediately forward. In the first row of economy seats, however, there is no immediate forward row of like number of seats, and thus first row seats require different amenity configurations and alternative mounting locations, which increase cost and complexity.

One solution for mounting front row economy class seat amenities involves utilizing the dedicated floor to ceiling bulkhead that divides the premium and economy classes. This solution is disadvantageous not only because it requires a dedicated bulkhead which consumes valuable floor space, but also requires custom amenity configurations for attaching to the bulkhead and servicing the first row.

Accordingly, to eliminate the need for a dedicated bulkhead and to simplify the seating arrangement within the cabin, what is needed is another way to divide the seating classes that can accommodate the transition between rows of different numbers of seats as well as accommodate the amenities for the first row in economy classes.

BRIEF SUMMARY OF THE INVENTION

In one aspect, provided herein is a bulkhead configured to divide different seating classes in an aircraft.

In another aspect, provided herein is a bulkhead configured to divide rows of different numbers of seats.

In yet another aspect, the bulkhead provides privacy between premium and economy seating classes.

In yet another aspect, the bulkhead is configured for attachment to the back of a row of seats, eliminating the need for a floor to ceiling bulkhead and freeing valuable floor space.

In yet another aspect, the bulkhead is configured for attachment to the back of a pair of premium class seats and serves as the mounting location for amenities for serving an aft positioned economy class row including more than two seats.

In yet another aspect, the bulkhead extends horizontally substantially the length of the row to which it attaches and extends vertically to about the height of the overhead luggage bins.

In yet another aspect, the bulkhead covers any gap between adjacent premium class seats.

In yet another aspect, the bulkhead is a shell attached to the back of a first group of seats in a manner that does not interfere with the recline functionality of the seats.

In yet another aspect, the bulkhead includes a partition that extends substantially vertically upward from the shell that fills the space between the top of the seats and the overhead luggage bins.

In yet another aspect, the bulkhead includes amenities such as video monitors, tray tables, storage pockets, etc., for serving the aft positioned row.

In yet another aspect, the bulkhead serves as the attachment point for a privacy curtain that divides passenger classes in the aisle.

To achieve the foregoing and other aspects and advantages, provided herein is a bulkhead for dividing passenger seating classes, the bulkhead configured for attachment to the back of a first row of premium class passenger seats, wherein a backside of the bulkhead is fitted with amenities that serve an aft positioned second row of economy class seats, wherein the first row of seats includes a lesser number of seats than the second row of seats.

In a further embodiment, the first row of seats to which the bulkhead attaches may include two seats, and wherein the backside of the bulkhead may be fitted with three sets of amenities for serving three seats of the second row of seats.

In a further embodiment, the bulkhead may be fitted with a number of like amenities equal in number to the number of seats in the second row of seats.

In a further embodiment, the amenities may include one or more of tray tables, video monitors and storage pockets.

In a further embodiment, the bulkhead may include a partition that extends vertically upward from the bulkhead that fills space between a top of the bulkhead and overhead luggage bins.

In a further embodiment, the bulkhead may extend forward at least on an aisle side of the first row of seats to encompass an armrest of the first row of seats.

In a further embodiment, the bulkhead may span horizontally to cover a gap between the seats of the first row of seats.

In a further embodiment, the bulkhead may serve as the attachment point for a class dividing aisle curtain.

In a further embodiment, the bulkhead may be a molded shell that extends horizontally the length of the first row of seats and vertically to a top of the seats of the first row of seats.

In a further embodiment, the first row of seats may include two seats, the second row of seats may include three seats, and the bulkhead may be fitted with three tray tables and three video monitors that face and serve the second row of seats.

In a further embodiment, the bulkhead may extend vertically from the aircraft deck to a top of the seats of the first row of seats.

According to another embodiment of the invention, provided herein is a passenger seating arrangement including a first row of seats including a first number of seats, a second row of seats equal in length to the first row of seats and including a greater number of seats than the first row of seats, and a bulkhead dividing the first and second rows of seats, the bulkhead configured for attachment to the first row of seats and fitted with amenities that face and serve the second row of seats.

In a further embodiment, the first row of seats may include two seats and the second row of seats may include three seats.

In a further embodiment, the bulkhead may be fitted with a number of like amenities equal in number to the number of seats in the second row of seats.

In a further embodiment, the bulkhead may include a partition that extends vertically upward from the bulkhead that fills space between a top of the bulkhead and overhead luggage bins.

In a further embodiment, the bulkhead may extend forward at least on an aisle side of the first row of seats to encompass an armrest of the first row of seats.

In a further embodiment, the bulkhead may serve as the attachment point for a class dividing aisle curtain.

In a further embodiment, the first row of seats may include two seats, the second row of seats may include three seats, and the bulkhead may be fitted with three tray tables and three video monitors that face and serve the second row of seats.

The class dividing passenger seat bulkhead and passenger seating arrangement embodiments disclosed herein may include one or more or any combination of the above features, aspects and advantages.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, a bulkhead for dividing passenger seating classes and a passenger seating arrangement including such a bulkhead are shown. The bulkhead and seating arrangement are advantageous in that the bulkhead is configured for attachment to the back of a first row of premium class passenger seats and is fitted with amenities that serve an aft positioned second row of a greater number of economy class seats. Thus, the present invention provides a solution for both dividing passenger seating classes and supporting amenities for the first row of economy class seats. The bulkhead can be fitted with a partition that extends vertically upward from the bulkhead to further divide and provide privacy between the seating classes.

Figure 1:
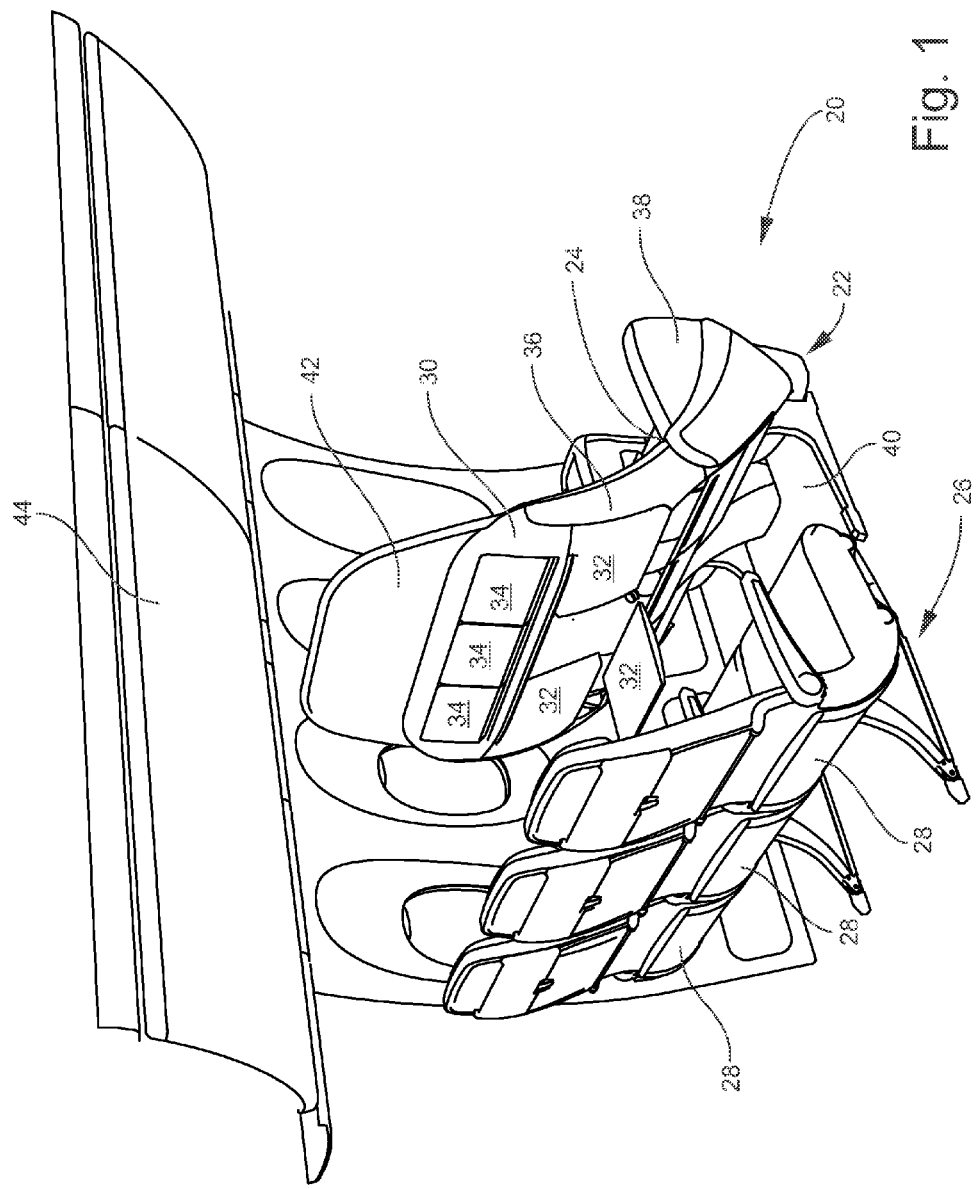
FIG. 1 is a rear perspective view of a class dividing passenger seat bulkhead according to an embodiment of the invention.
Figure 2:
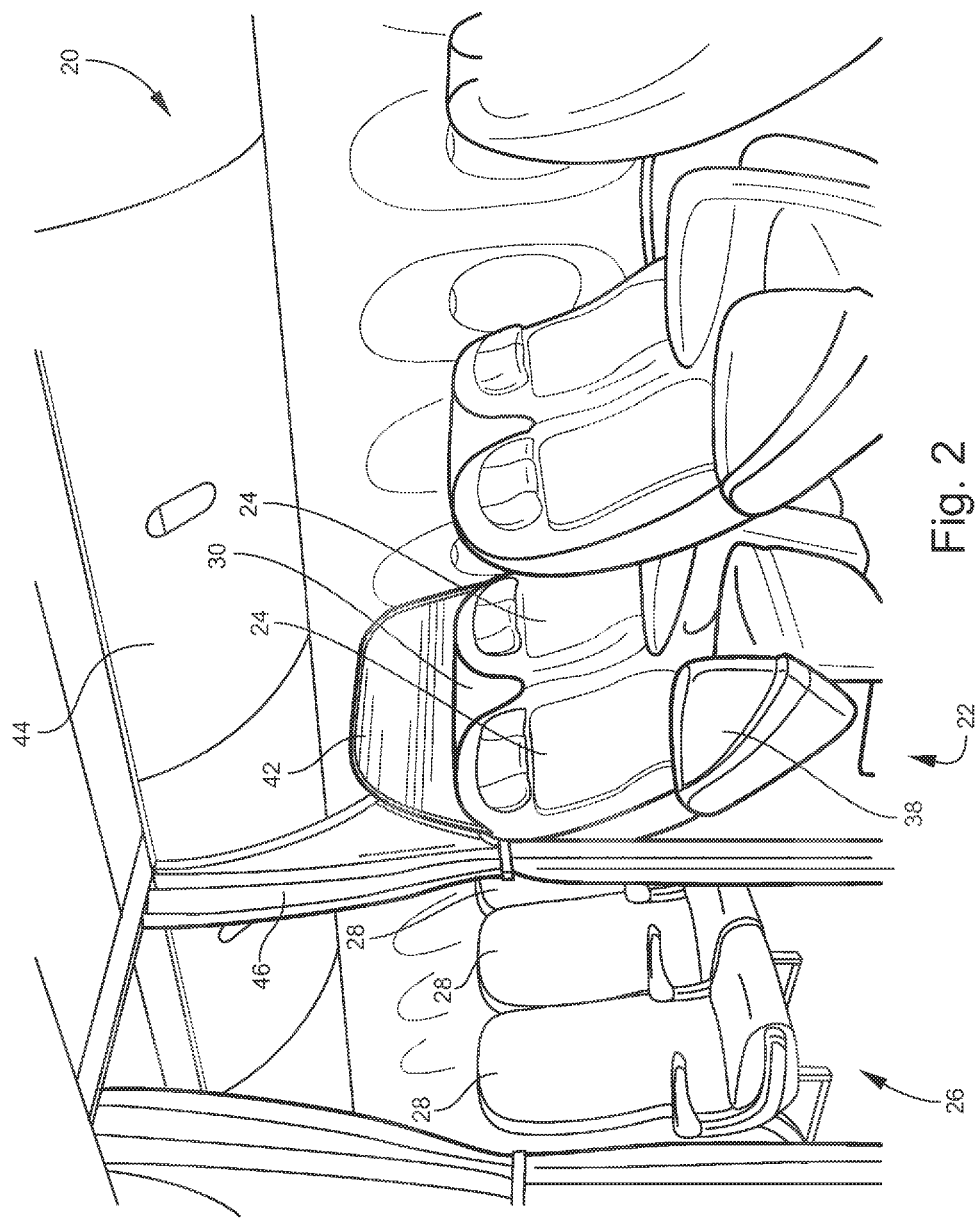
FIG. 2 is a front perspective view of the class dividing passenger seat bulkhead of FIG. 1 and further illustrating aisle curtain attachment.

Referring to FIGS. 1 and 2, a passenger seating arrangement is shown generally at reference numeral 20, and includes a first row of seats 22 including a first number of seats 24, a second row of seats 26 equal in length to the first row of seats but including a greater number of seats 28 than the first row of seats, and a bulkhead 30 dividing the first and second rows of seats. The bulkhead is integrated into or configured for attachment to the first row of seats 22. The bulkhead 30 is fitted with amenities that face and serve the second row of seats 26.

In the exemplary seating arrangement shown, the first row of seats 22 includes two premium class seats 24, and the second row of seats 26 includes three economy class seats 28. The premium class seats 24 are wider than the economy class seats 28, thus the first and second rows 22, 26 have substantially the same length but include a different number of seats, with the aft positioned second row of seats including a greater number of seats than the forward positioned first row of seats. Different numbers of seats and seating configurations are envisioned, and the present bulkhead can be modified to transition between rows of like numbers of seats and different numbers of seats.

The bulkhead 30 integrates multiple tray tables 32 and monitors 34 into the shell of a premium or business class seat group such that the economy class seats 28 positioned behind the premium class seats do not require special seats, in-arm tray tables or swing video monitors. The bulkhead 30 eliminates the need for a conventional floor to ceiling bulkhead, and also allows the first row of economy class seats to be standard seats, reducing weight and the cost of configuring the aircraft interior.

The bulkhead 30 is formed as a shell 36 shaped to generally conform to and surround the back of the first row of seats 22 to which it is attached. The bulkhead 30 covers any gaps between the premium class seats 24 and may extend forward at least on the aisle side of the row to encompass the armrest 38. The bulkhead 30 spans horizontally to cover substantially the entirety of the length of the first row 22 and spans vertically at least to the top of the seats to which it is attached. The bulkhead 30 is attached to the seat frame and can be suspended above the aircraft floor or deck 40 or can extend to the deck, and thus allows for a single seat frame design for each premium class seating group regardless of the group's position within the cabin.

The bulkhead 30 is configured to be attached to the back of the seats without affecting or requiring modification to the attachment of the seating group to the floor. The bulkhead 30 may be attached to and supported by, for example, one or more of the legs, frame members, armrests and other components of the seats. The bulkhead 30 is positioned rearward of the seat backs and is configured so as not to interfere with the reclining motion of the seats 24, for example a seat recline mechanism in which the seat translates forward with the reclining motion.

The bulkhead 30 may be configured with or without a vertical partition 42 for closing off the space above the seat backs to further divide the seating classes. The partition 42 may be shaped to substantially fill the space between the top of the bulkhead 30 and the overhead luggage bins 44. Because the partition 42 is removable, a universal bulkhead 30 can be provided for all premium class seat groups, with the partition being installed as desired or on rows dividing the classes, as best shown in FIG. 2.

The bulkhead 30 may be configured to accommodate amenities for a different number of seats in an aft positioned row, or the same number of seats in an aft positioned row. For example, the bulkhead 30 can include three tray tables 32 and video monitors 34 for serving three aft positioned seats, or can include two tray tables 32 and video hardware 34 for serving two like aft positioned seats.

Referring to FIG. 2, a curtain 46 may attach at one or more points along one or more of the bulkhead 30 and partition 42 to secure the curtain and span and fill any gaps between the overhead stowage bins 44, the partition 42 and the aisle.

Figure 3:
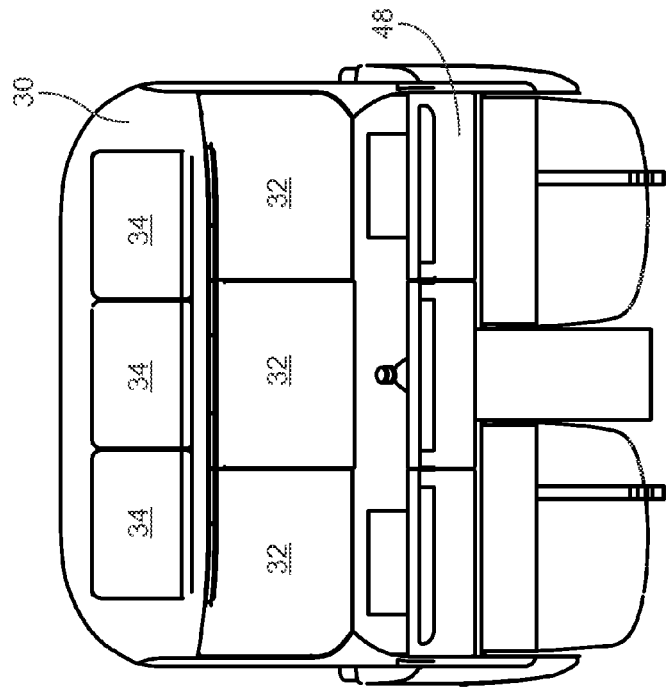
FIG. 3 is a rear elevation view of the class dividing passenger seat bulkhead shown with a vertical partition.
Figure 4:
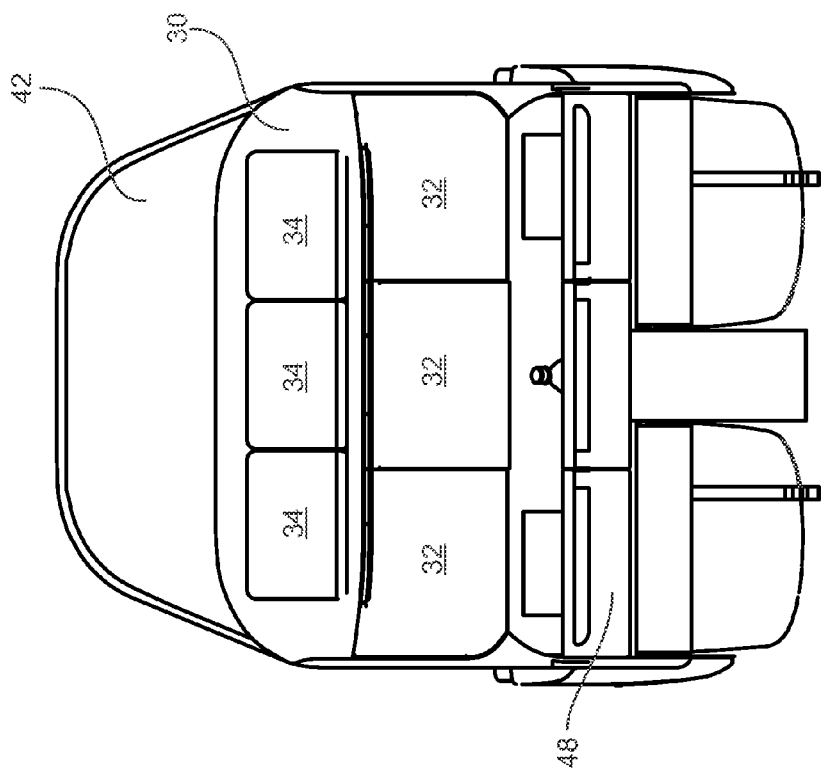
FIG. 4 is a rear elevation view of the class dividing passenger seat bulkhead shown without the vertical partition.

Referring to FIGS. 3 and 4, the bulkhead 30 may be constructed from lightweight, impact resistant material for weight savings and durability. The bulkhead 30 may have any shape, and the shape and appearance may be customized to match the cabin interior. The bulkhead 30 may be installed as original equipment with the seats or as a retrofit application. FIG. 3 shows the bulkhead 30 with the attached partition 42. FIG. 4 shows the bulkhead 30 without the partition.

The bulkhead 30 is fitted with or otherwise supports amenities that face and serve the aft positioned row of seats. Passenger amenities may include, but are not limited to, pivoting tray tables 32, video monitors 34, storage pockets 48, etc. The bulkhead 30 can be molded to include pockets, other storage compartments, monitor recesses, etc. Electronics and cabling associated with video equipment fitted in the bulkhead 30 may be routed within the bulkhead and concealed from view.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A passenger seating arrangement, comprising:
a first row of seats including a first number of seats;
a second row of seats equal in length to the first row of seats and including a greater number of seats than the first row of seats; and
a bulkhead dividing the first and second rows of seats, the bulkhead configured for attachment to the first row of seats and fitted with amenities that face and serve the second row of seats, the bulkhead extending forward at least on an aisle side of the first row of seats to encompass an armrest of the first row of seats.

2. The passenger seating arrangement of claim 1, wherein the first row of seats includes two seats and the second row of seats includes three seats.

3. The passenger seating arrangement of claim 1, wherein the bulkhead is fitted with a number of like amenities equal in number to the number of seats in the second row of seats.

4. The passenger seating arrangement of claim 1, wherein the amenities include one or more of tray tables, video monitors and storage pockets.

5. The passenger seating arrangement of claim 1, wherein the bulkhead further comprises a partition that extends vertically upward from the bulkhead that fills space between a top of the bulkhead and overhead luggage bins.

6. The passenger seating arrangement of claim 1, wherein the bulkhead spans horizontally to cover a gap between the seats of the first row of seats.

7. The passenger seating arrangement of claim 1, further comprising a class dividing aisle curtain that attaches to the bulkhead.

8. The passenger seating arrangement of claim 1, wherein the first row of seats includes two seats, the second row of seats includes three seats, and the bulkhead is fitted with three tray tables and three video monitors that face and serve the second row of seats.

9. A bulkhead for dividing passenger seating classes, the bulkhead configured for attachment to the back of a first row of premium class passenger seats, wherein a backside of the bulkhead is fitted with amenities that serve an aft positioned second row of economy class seats, wherein the first row of seats includes a lesser number of seats than the second row of seats, and wherein the bulkhead extends forward at least on an aisle side of the first row of seats to encompass an armrest of the first row of seats.

10. The bulkhead of claim 9, wherein the first row of seats to which the bulkhead attaches includes two seats, and wherein the backside of the bulkhead is fitted with three sets of amenities for serving three seats of the second row of seats.

11. The bulkhead of claim 9, wherein the bulkhead is fitted with a number of like amenities equal in number to the number of seats in the second row of seats.

12. The bulkhead of claim 9, wherein the amenities include one or more of tray tables, video monitors and storage pockets.

13. The bulkhead of claim 9, wherein the bulkhead further comprises a partition that extends vertically upward from the bulkhead that fills space between a top of the bulkhead and overhead luggage bins.

14. The bulkhead of claim 9, wherein the bulkhead spans horizontally to cover a gap between the seats of the first row of seats.

15. The bulkhead of claim 9, wherein the bulkhead serves as the attachment point of a class dividing aisle curtain.

16. The bulkhead of claim 9, wherein the bulkhead is a molded shell that extends horizontally the length of the first row of seats and vertically to a top of the seats of the first row of seats.

17. The bulkhead of claim 9, wherein the first row of seats includes two seats, the second row of seats includes three seats, and the bulkhead is fitted with three tray tables and three video monitors that face and serve the second row of seats.

18. The bulkhead of claim 9, wherein the bulkhead extends vertically from an aircraft deck to a top of the first row of seats.

* * * * *